United States Patent
Morimura et al.

(10) Patent No.: US 10,600,323 B2
(45) Date of Patent: Mar. 24, 2020

(54) VEHICLE EXTERNAL NOTIFICATION DEVICE

(71) Applicant: TOYOTA JIDOSHA KABUSHIKI KAISHA, Toyota-shi, Aichi (JP)

(72) Inventors: Junichi Morimura, Sunto-gun (JP); Junya Watanabe, Sunto-gun (JP); Seiji Arakawa, Sunto-gun (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 16/010,618

(22) Filed: Jun. 18, 2018

(65) Prior Publication Data

US 2019/0043363 A1 Feb. 7, 2019

(30) Foreign Application Priority Data

Aug. 3, 2017 (JP) .................................. 2017-150799

(51) Int. Cl.
*G08G 1/16* (2006.01)
*B60Q 1/26* (2006.01)

(52) U.S. Cl.
CPC .............. *G08G 1/166* (2013.01); *B60Q 1/26* (2013.01)

(58) Field of Classification Search
CPC ...... H04N 5/232; H04N 13/271; H04N 5/225; H04N 13/106; H04N 13/111; H04N 13/117; H04N 13/204; H04N 13/239; H04N 13/243; H04N 13/246; H04N 13/282; H04N 13/344; H04N 13/398; H04N 2013/0081; H04N 5/23216; H04N 5/23229; H04N 5/23232; H04N 5/247; H04N 5/3745; H04N 7/18; G01C 3/06; G01C 21/365; G01C 21/3697; G01C 21/26; G01C 21/28;
(Continued)

(56) References Cited

U.S. PATENT DOCUMENTS

2012/0056734 A1* 3/2012 Ikeda ..................... G08G 1/165
340/425.5
2016/0121791 A1* 5/2016 Shimizu ................. G08G 1/166
340/435
(Continued)

FOREIGN PATENT DOCUMENTS

JP 2015-178288 A 10/2015
JP 2016-166013 A 9/2016
JP 2018-184151 A 11/2018

*Primary Examiner* — Daniel Previl
(74) *Attorney, Agent, or Firm* — Sughrue Mion, PLLC

(57) ABSTRACT

The vehicle external notification device includes a notification unit that gives notice of the information to the outside of the vehicle, a proposal action determination unit that determines an action to be proposed to the pedestrian, a notification control unit that causes the notification unit to notify the pedestrian of information on the action to be proposed to the pedestrian, an action detection unit that detects an action of the pedestrian, and an action determination unit that determines whether or not the action of the pedestrian which is detected by the action detection unit is the action proposed to the pedestrian. The notification control unit causes the notification unit to notify the pedestrian of information indicating that the action of the pedestrian is the proposed action, when the action determination unit determines that the action of the pedestrian is the action proposed to the pedestrian.

6 Claims, 5 Drawing Sheets

(58) Field of Classification Search
CPC ...... G01C 21/30; G01C 21/3602; G01C 3/00;
G01C 3/08; G01C 3/085; G01C 3/10;
G05D 2201/0213; G05D 1/0088; G05D
1/0246; G05D 1/0278; G05D 1/0061;
G05D 1/0214; G05D 1/0221; G05D
1/0248; G05D 1/0257; G05D 1/0274;
G05D 1/0297; G06T 7/593; G06T
2207/10012; G06T 2207/30252; G06T
7/557; G06T 11/60; G06T 1/00; G06T
2207/10028; G06T 2207/10048; G06T
2207/10052; G06T 5/002; G06T 5/50;
G06T 7/11; G06T 7/136; G06T 7/194;
G06T 7/285; G06T 7/292; G06T 7/50;
G06T 7/579; G06T 7/70; G06T 7/74;
G06T 7/80; G06T 7/85; B60Q 1/34;
B60Q 1/50; B60Q 2400/50; G01S 17/89;
G01S 17/93; G01S 11/12; G01S 17/003;
G01S 17/08; G01S 17/36; G01S 19/04;
G01S 19/07; G01S 19/14; G01S 1/70;
G01S 5/16; G02B 6/32; G02B 6/44;
G02B 2027/0134; G02B 2027/0138;
G02B 2027/014; G02B 2027/0178; G02B
27/0093; G02B 27/0172; G02B 6/42;
G02B 6/4206; G06K 9/00805; G06K
9/3241; G07C 9/00309; G08G 1/16;
G08G 1/165; G08G 1/166; G08G 1/167;
G08G 1/00; G08G 1/09; G08G 1/164;
G08G 1/22; H04R 2499/13; H04R 5/04;
H04S 2420/01; H04S 7/30; B25J 19/021;
B25J 9/1666; B60R 21/00; B60W
2550/30; B60W 2750/306; B60W 30/14;
B60W 30/182; B60W 40/09; B60W
40/10; B60W 50/0098; B60W 50/08;
B60W 50/10; B62D 57/00; G01B 11/00;
G01B 11/26
USPC ............ 340/903, 425.5, 904, 907, 910, 925,
340/995.13, 426.16, 426.23, 463, 468
See application file for complete search history.

(56) References Cited

U.S. PATENT DOCUMENTS

2017/0140651 A1\* 5/2017 Lee ................. G08G 1/166
2017/0359565 A1\* 12/2017 Ito .................. H04N 5/225
2017/0364066 A1\* 12/2017 Yamada ............ G05D 1/0016

\* cited by examiner

VEHICLE EXTERNAL NOTIFICATION DEVICE

CROSS-REFERENCE TO RELATED APPLICATION

This application claims the benefit of priority from Japanese Patent Application No. 2017-150799, filed Aug. 3, 2017, the entire contents of which are incorporated herein by reference.

TECHNICAL FIELD

The present disclosure relates to a vehicle external notification device.

BACKGROUND

An on-vehicle device disclosed in Japanese Unexamined Patent Publication No. 2016-166013 determines contents of automatic driving on the basis of a positional relationship between a host vehicle and a person approaching the host vehicle when the person approaching the host vehicle during automatic driving is detected, and notifies the approaching person of information based on the determined contents of the automatic driving. For example, the on-vehicle device notifies the approaching person of a sound notice of "please go first" when the on-vehicle device determines contents of automatic driving that the host vehicle yields a road to the approaching person.

SUMMARY

In the above-described on-vehicle device, even when a moving object, such as an approaching person, acts in accordance with contents of a notice given from a host vehicle, the approaching person cannot know whether the approaching person's action based on the contents of the notice is recognized by the host vehicle. For this reason, there is a concern that the approaching person feels uneasy whether or not the approaching person may continue the action. In particular, as compared to a case of manual driving in which a driver of the host vehicle and the approaching person can easily communicate with each other, when the host vehicle is in an automatic driving mode, the approaching person easily feels uneasy.

Consequently, in this technical field, there is a demand for a vehicle external notification device capable of notifying a moving object that an action of the moving object is recognized by a host vehicle during automatic driving.

According to an aspect of the present disclosure, there is provided a vehicle external notification device that notifies a moving object, which is provided in a vicinity of a host vehicle during automatic driving, of information, the vehicle external notification device including a notification unit that gives notice of the information to an outside of the vehicle, a moving object detection unit that detects the moving object, a proposal action determination unit that determines an action to be proposed to the moving object detected by the moving object detection unit, a notification control unit that causes the notification unit to notify the moving object, which is detected by the moving object detection unit, of information on the action to be proposed to the moving object, an action detection unit that detects an action of the moving object detected by the moving object detection unit, and an action determination unit that determines whether or not the action of the moving object which is detected by the action detection unit is the action proposed to the moving object, in which the notification control unit causes the notification unit to notify the moving object of information indicating that the action of the moving object is the proposed action, when the action determination unit determines that the action of the moving object is the action proposed to the moving object.

According to the vehicle external notification device, an action to be proposed to the detected moving object is determined, and the moving object is notified of information on the determined action. When it is determined that the subsequent action of the moving object is the action proposed to the moving object, the moving object is notified of information indicating that the action of the moving object is the proposed action. Thereby, the device can inform the moving object that the moving object acts in accordance with the proposal of the host vehicle to thereby inform the moving object that the moving object may continue the action. Accordingly, the device can notify the moving object that the action of the moving object is recognized by the host vehicle during automatic driving.

In the vehicle external notification device according to the aspect of the present disclosure, the notification control unit may cause the notification unit to notify the moving object, which is detected by the moving object detection unit, of the information on the action to be proposed to the moving object in a first mode, and may then cause the notification unit to notify the moving object of the information on the action to be proposed to the moving object in a second mode emphasized more than the first mode, when the action determination unit determines that the action of the moving object is not the action proposed to the moving object. Thereby, the device can make the moving object easily notice that the action of the moving object is not the action proposed by the host vehicle, when the moving object does not act in accordance with the proposal of the host vehicle.

According to various aspects of the present disclosure, it is possible to notify a moving object that an action of the moving object is recognized by a host vehicle during automatic driving.

DETAILED DESCRIPTION

Figure 1:
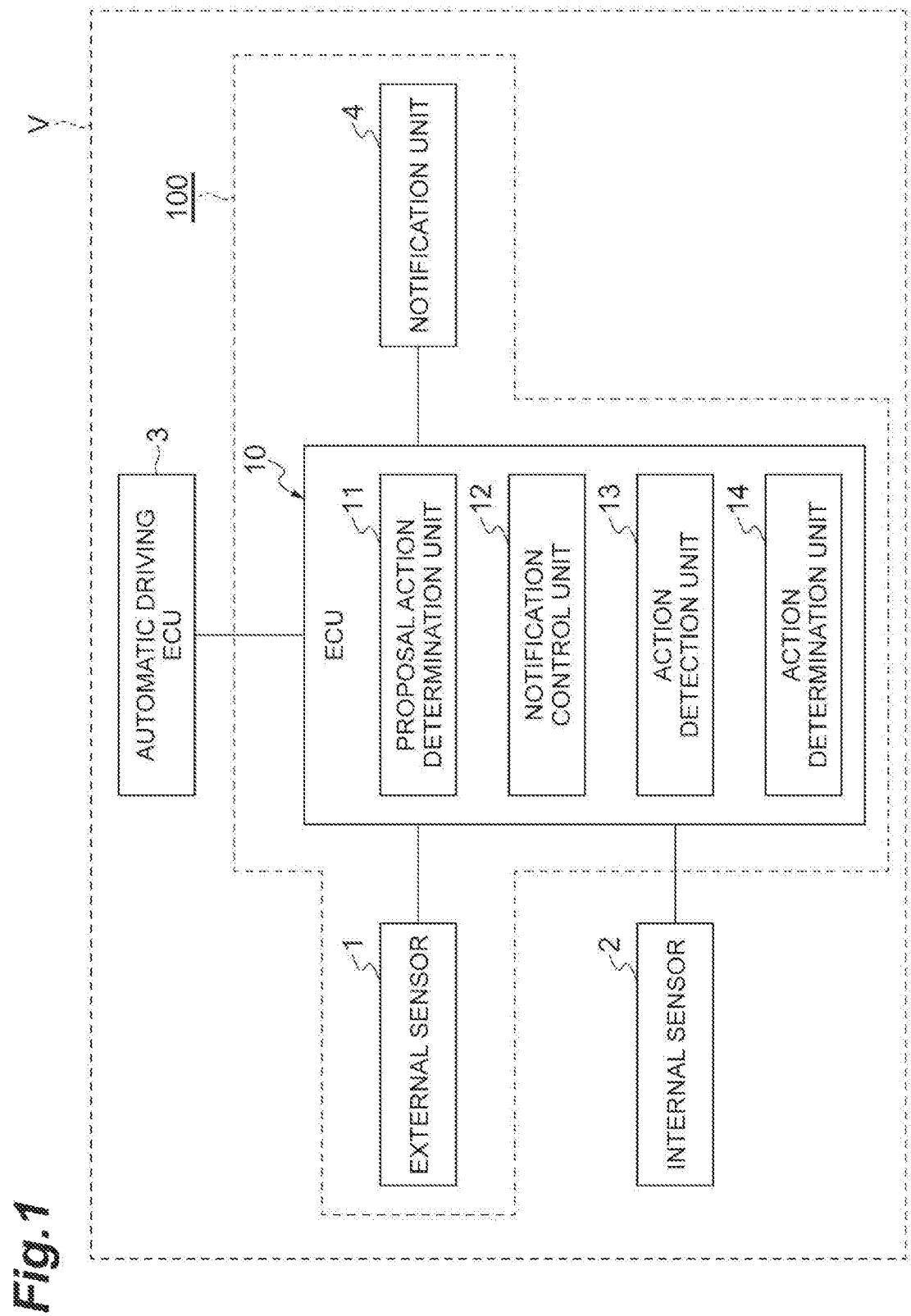
FIG. 1 is a block diagram illustrating a vehicle external notification device according to this embodiment.

Hereinafter, an exemplary embodiment will be described with reference to the accompanying drawings. Meanwhile, in the drawings, the same or equivalent portions are denoted by the same reference numerals and signs, and a repeated description will be omitted.

FIG. 1 is a block diagram illustrating a vehicle external notification device 100 according to this embodiment. As illustrated in FIG. 1, the vehicle external notification device 100 is a device which is mounted on a host vehicle V, such as an automobile, which is capable of automatic driving, and notifies a moving object, which is in the vicinity of the host vehicle V during automatic driving, of information. The automatic driving is vehicle control for causing the host vehicle V to automatically travel along a target route which is set in advance. In the automatic driving, a driver does not need to perform a driving operation, and the host vehicle V automatically travels. In this embodiment, the vehicle external notification device 100 displays the information so as to be recognizable from the outside of the vehicle.

The vehicle external notification device 100 includes an Electronic Control Unit (ECU) 10 that generally controls the device, and an external sensor (moving object detection unit) 1 and a notification unit 4 which are connected to the ECU 10. An internal sensor 2 and an automatic driving ECU 3 are further connected to the ECU 10. The ECU 10 is an electronic control unit including a Central Processing Unit (CPU), a Read Only Memory (ROM), a Random Access Memory (RAM), a Controller Area Network (CAN) communication circuit, and the like.

The ECU 10 is connected to a network for communication using, for example, the CAN communication circuit, and is communicably connected to components of the host vehicle V. That is, the ECU 10 can refer to detection results of the external sensor 1 and the internal sensor 2 and a traveling plan of the host vehicle V which is generated in the automatic driving ECU 3. The ECU 10 can output a signal to the notification unit 4.

The ECU 10 loads programs stored in, for example, the ROM into the RAM, and executes the programs loaded into the RAM by the CPU to realize functions of vehicle external notification to be described later. The ECU 10 may be constituted by a plurality of ECUs.

The external sensor 1 is a detection apparatus which is mounted on the host vehicle V and detects circumstances in the vicinity of the host vehicle V. The external sensor 1 detects, for example, a moving object in the vicinity of the host vehicle V. The external sensor 1 includes at least one of a camera and a radar sensor. The moving object includes, for example, a pedestrian, a bicycle, a two-wheeled vehicle, and the like. Hereinafter, a pedestrian will be described as an example of the moving object.

The camera is an image capture apparatus that captures an image of an external state of the host vehicle V. The camera transmits image capture information on the external state of the host vehicle V to the ECU 10. The camera may be a monocular camera or a stereo camera. The stereo camera includes two image capture units that are disposed so as to reproduce binocular parallax. Image capture information of the stereo camera also includes information (distance information) regarding a depth direction of a captured image.

The radar sensor is a detection apparatus that detects an obstacle in the vicinity of the host vehicle V by using radio waves (for example, millimeter waves) or light. The radar sensor includes, for example, a millimeter wave radar or a Light Detection and Ranging (LIDAR). The radar sensor transmits the radio waves or light to the vicinity of the host vehicle V, and receives the radio waves or light reflected by an obstacle to detect the obstacle. The radar sensor transmits the detected obstacle information to the ECU 10. The obstacle includes a guardrail, a building, and the like which are fixed obstacles, in addition to a moving object, such as a pedestrian, which is a moving obstacle.

The internal sensor 2 is a detection apparatus that detects a traveling state and a vehicle state of the host vehicle V. The internal sensor 2 includes, for example, a vehicle speed sensor.

The vehicle speed sensor is a detector that detects a vehicle speed of the host vehicle V. The vehicle speed sensor is provided in, for example, a wheel of the host vehicle V, a drive shaft that rotating integrally with the wheel, or the like, and a wheel speed sensor that detects the rotation speed of the wheel is used as the vehicle speed sensor. The vehicle speed sensor transmits the detected vehicle speed information to the ECU 10.

The automatic driving ECU 3 executes automatic driving of the host vehicle V. The automatic driving ECU 3 is an electronic control unit including a CPU, a ROM, a RAM, a CAN communication circuit, and the like. The automatic driving ECU 3 is connected to a map database that stores map information, a positioning unit that measures the position of the host vehicle V on a map by a Global Positioning System (GPS), various actuators for causing the host vehicle V to travel, and various sensors.

The automatic driving ECU 3 is connected to a network for communication using, for example, a CAN communication circuit, and is communicably connected to components of the host vehicle V. That is, the automatic driving ECU 3 can refer to the map information of the map database, the positional information of the host vehicle V on the map which is measured by the positioning unit, and detection results of the various sensors. The ECU 10 can output signals to the various actuators.

The automatic driving ECU 3 loads programs stored in, for example, the ROM into the RAM, and executes the programs loaded into the RAM by the CPU to realize functions of the automatic driving system mounted on the host vehicle V. The automatic driving ECU 3 may be constituted by a plurality of ECUs.

The map information of the map database includes, for example, positional information of a road (positional information for each traffic lane), information on the shape of a road (information such as a type of curve or linear portion and the curvature of a curve), information on the width of a road (information on the width of a traffic lane), information on a gradient of a road, information on a cant angle of a road, information on a vehicle speed limit in a road, and information on a road indicator, such as a pedestrian crossing, which is provided in a road. The various actuators include a steering actuator that controls a steering angle of the host vehicle V, a brake actuator that controls a brake system of the host vehicle V, and an engine actuator that controls an engine (or a motor of an electric car) of the host vehicle V.

The automatic driving ECU 3 retrieves a target route from the present position of the host vehicle V to a destination, on the basis of the map information of the map database, the positional information of the host vehicle V on the map which is measured by the positioning unit, and a destination which is set in advance. The automatic driving ECU 3 generates a traveling plan for causing the host vehicle V to travel along the target route. The traveling plan includes, for example, a moving path and a moving speed. The automatic driving ECU 3 generates a traveling plan of the host vehicle V by a well-known method. The automatic driving ECU 3 executes automatic driving of the host vehicle V along the traveling plan, on the basis of the positional information of the host vehicle V on the map which is measured by the positioning unit. In addition, the automatic driving ECU 3 transmits the generated traveling plan to the ECU 10. The automatic driving ECU 3 transmits control signals to the various actuators to control the host vehicle V and execute automatic driving.

Figure 2:
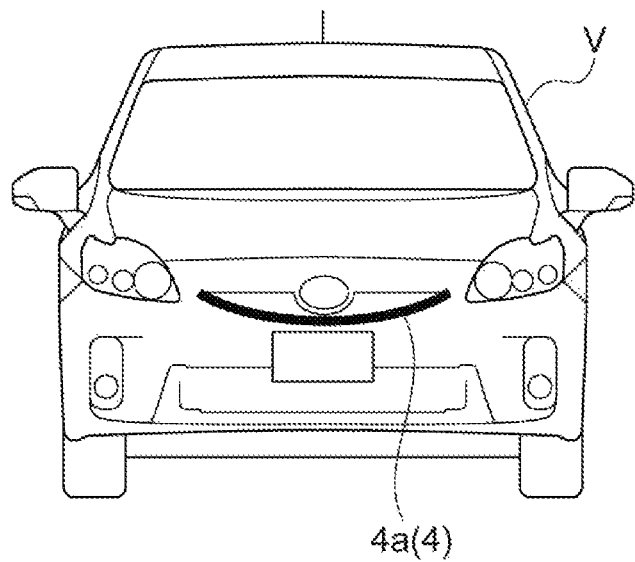
FIG. 2 is a front view of a host vehicle.
Figure 3:
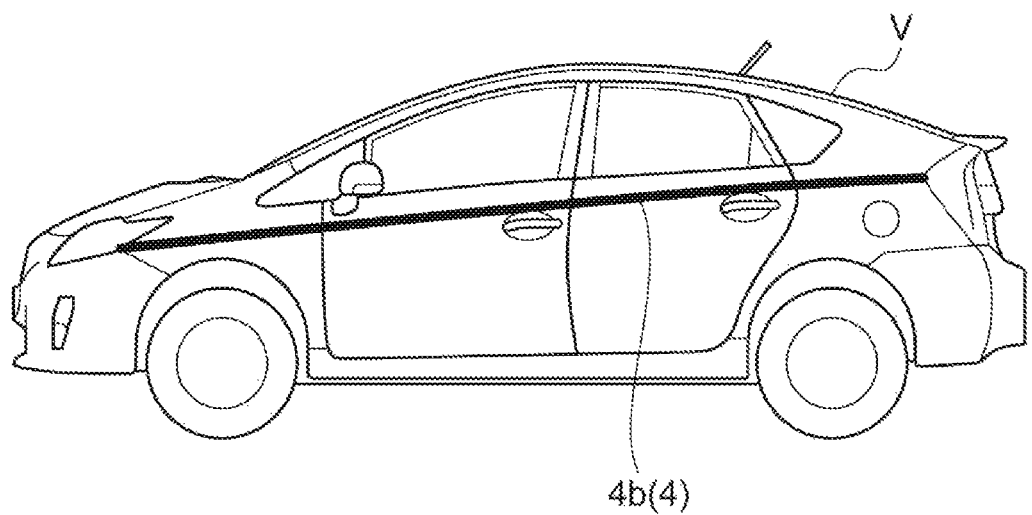
FIG. 3 is a side view of the host vehicle.

FIG. 2 is a front view of the host vehicle V. FIG. 3 is a side view of the host vehicle V. The notification unit 4 illustrated in FIGS. 2 and 3 is a device for giving notice of information to the outside of the vehicle. Specifically, the notification unit 4 is a display device that displays information so as to be visually recognizable from the outside of the vehicle. The notification unit 4 includes a first notification unit 4a and a second notification unit 4b.

The first notification unit 4a is a display device that displays information so as to be visually recognizable from the front of the host vehicle V. The first notification unit 4a is provided on the front surface of the host vehicle V. In more detail, the first notification unit 4a is configured such that a plurality of Light Emitting Diodes (LEDs) are disposed in a row in the width direction of the host vehicle V along the outer edge of a grill (front grill) on the front surface of the host vehicle V. The first notification unit 4a can change the color of display, the cycle of flickering, and the like. Meanwhile, the first notification unit 4a is not limited to the aspect illustrated in FIG. 2.

The second notification unit 4b is a display device that displays information so as to be visually recognizable from the side of the host vehicle V. The second notification unit 4b is provided on the side surface of the host vehicle V. In more detail, the second notification unit 4b is configured such that a plurality of LEDs are disposed in a row in a front-back direction of the host vehicle V along the side surface of the host vehicle V. The second notification unit 4b is also provided not only on the left side surface illustrated in FIG. 3 but also on the right side surface of the host vehicle V. The second notification unit 4b can change the color of display, the cycle of flickering, and the like. Meanwhile, the second notification unit 4b is not limited to the aspect illustrated in FIG. 3.

Next, a mechanical configuration of the ECU 10 will be described with a situation illustrated in FIG. 4 as an example.

Figure 4:
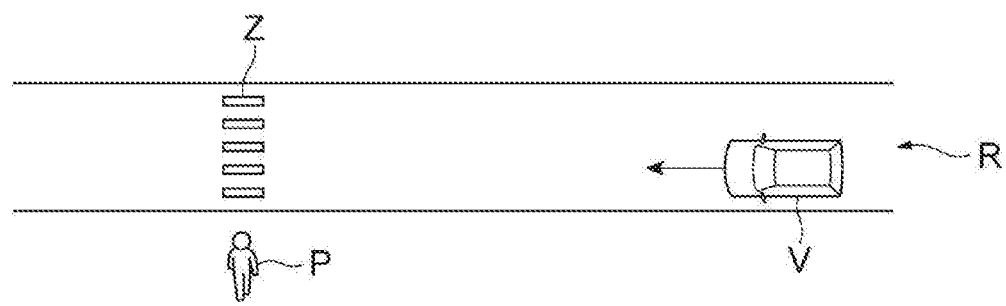
FIG. 4 is a plan view illustrating a situation where a pedestrian is positioned in the vicinity of a pedestrian crossing provided in front of the host vehicle.

FIG. 4 is a plan view illustrating a situation where a pedestrian P is positioned in the vicinity of a pedestrian crossing Z provided in front of the host vehicle V. In FIG. 4, the host vehicle V traveling on a road R is illustrated. On the road R, the pedestrian crossing Z is provided on the other side of the host vehicle V traveling. In addition, the pedestrian P stands in the vicinity of the pedestrian crossing Z in a side strip provided together with the road R.

As illustrated in FIG. 1, the ECU 10 includes a proposal action determination unit 11, a notification control unit 12, an action detection unit 13, and an action determination unit 14. Meanwhile, a portion of the functions of the ECU 10 may be executed by a computer in an institution, such as an information management center, which is capable of communicating with the host vehicle V, or may be executed by a portable information terminal which is capable of communicating with the host vehicle V.

As illustrated in FIGS. 1 and 4, the proposal action determination unit 11 determines an action to be proposed to the pedestrian P which is detected by the external sensor 1. In more detail, the proposal action determination unit 11 predicts a future action of the pedestrian P on the basis of information (image capture information, obstacle information) received from the external sensor 1, a traveling plan of the host vehicle V which is generated by the automatic driving ECU 3, map information of the map database, and positional information of the host vehicle V on the map which is measured by the positioning unit, and determines an action to be proposed to the pedestrian P so that the pedestrian P can execute the predicted action. The "action to be proposed to the pedestrian P" may be an action for allowing the pedestrian P to safely and smoothly execute the predicted action of the pedestrian P, for example, on the basis of a traffic rule, the predicted action of the pedestrian P, and the traveling plan of the host vehicle V.

Here, since the pedestrian P is positioned at the side strip in the vicinity of the pedestrian crossing Z, the proposal action determination unit 11 predicts that a future action of the pedestrian P is an action of crossing the pedestrian crossing Z. In addition, the proposal action determination unit 11 determines that the host vehicle V can safely stop in front of the pedestrian crossing Z and that the pedestrian P can safely cross the pedestrian crossing Z, for example, on the basis of a moving speed of the host vehicle V and a distance between the host vehicle V and the pedestrian crossing Z. Thereby, the proposal action determination unit 11 determines an action to be proposed to the pedestrian P to be an action indicating that the pedestrian P crosses the pedestrian crossing Z before the host vehicle V passes through the pedestrian crossing Z.

The notification control unit 12 causes the notification unit 4 to notify the pedestrian P, who is detected by the external sensor 1, of information on the action to be proposed to the pedestrian P, in a first mode. The "first mode" is a mode in which notice of information on the action to be proposed to the pedestrian P is given by being emphasized less than in a second mode to be described later. For example, the notification control unit 12 may cause the notification unit 4 to be displayed in a predetermined color or may cause the notification unit to flicker by a predetermined number of times at a predetermined cycle, as the notice in the first mode. As a more specific example, the notification control unit 12 may light the notification unit 4 in red or blue which is a color easily giving the pedestrian P a feeling of relief.

In addition, the notification control unit 12 causes the notification unit 4 to notify the pedestrian P of the information on the action to be proposed to the pedestrian P in the first mode, and then causes the notification unit 4 to notify the pedestrian P of information indicating that the action of the pedestrian P is the proposed action, when the action determination unit 14 determines that the action of the pedestrian P is the action proposed to the pedestrian P, as described later. In this case, for example, the notification control unit 12 may cause the notification unit 4 to be displayed in a predetermined color or may perform flickering by a predetermined number of times at a predetermined cycle. As a more specific example, the notification control unit 12 may cause the notification unit 4 to flicker twice or three times at low speed (for example, once per second) in red or blue which is a color easily giving the pedestrian P a feeling of relief.

In addition, the notification control unit 12 causes the notification unit 4 to notify the pedestrian P of the information on the action to be proposed to the pedestrian P in the first mode, and then causes the notification unit 4 to notify the pedestrian P of the information on the action to be proposed to the pedestrian P in the second mode, when the action determination unit 14 determines that the action of the pedestrian P is not the action proposed to the pedestrian P, as described later. The "second mode" is a mode in which notice of the information on the action to be proposed to the pedestrian P is given by being emphasized more than in the first mode. For example, the notification control unit 12 may cause the notification unit 4 to be displayed in a predetermined color or may cause the notification unit to flicker by a predetermined number of times at a predetermined cycle, as the notice in the second mode. As a more specific example, the notification control unit 12 may cause the notification unit 4 to be displayed in red or yellow which is a color which is easily noticed by the pedestrian P, or may cause the notification unit 4 to continuously flicker at high speed (for example, twice per second).

The action detection unit 13 detects an action of the pedestrian P which is detected by the external sensor 1. In particular, the action detection unit 13 detects an action of the pedestrian P notified of the information on the action to be proposed to the pedestrian P by the notification unit 4. In more detail, the action detection unit 13 acquires a moving vector of the pedestrian P on the basis of information (image capture information, obstacle information) received from the external sensor 1. The action detection unit 13 detects an action of the pedestrian P on the basis of the amount of change in the moving vector for a predetermined time (for example, one second or two seconds). As an example, the action detection unit 13 may detect an action of the pedestrian P by comparing the amount of change in the moving vector with a predetermined value which is set in advance. In the situation illustrated in FIG. 4, the pedestrian P stands in the vicinity of the pedestrian crossing Z at the side strip. For this reason, the action detection unit 13 may detect that the pedestrian P has started to cross the pedestrian crossing Z when the amount of change in the moving vector in a direction of the crossing of the pedestrian crossing Z is equal to or greater than the predetermined value, and may detect that the pedestrian P has not started to cross the pedestrian crossing Z when the amount of change in the moving vector in the direction of the crossing of the pedestrian crossing Z is less than the predetermined value.

The action determination unit 14 determines whether or not an action of the pedestrian P which is detected by the action detection unit 13 is the action proposed to the pedestrian P. In the situation illustrated in FIG. 4, the action determination unit 14 determines whether or not the action of the pedestrian P which is detected by the action detection unit 13 is an action indicating that the pedestrian P crosses the pedestrian crossing Z before the host vehicle V passes through the pedestrian crossing Z.

Figure 5:
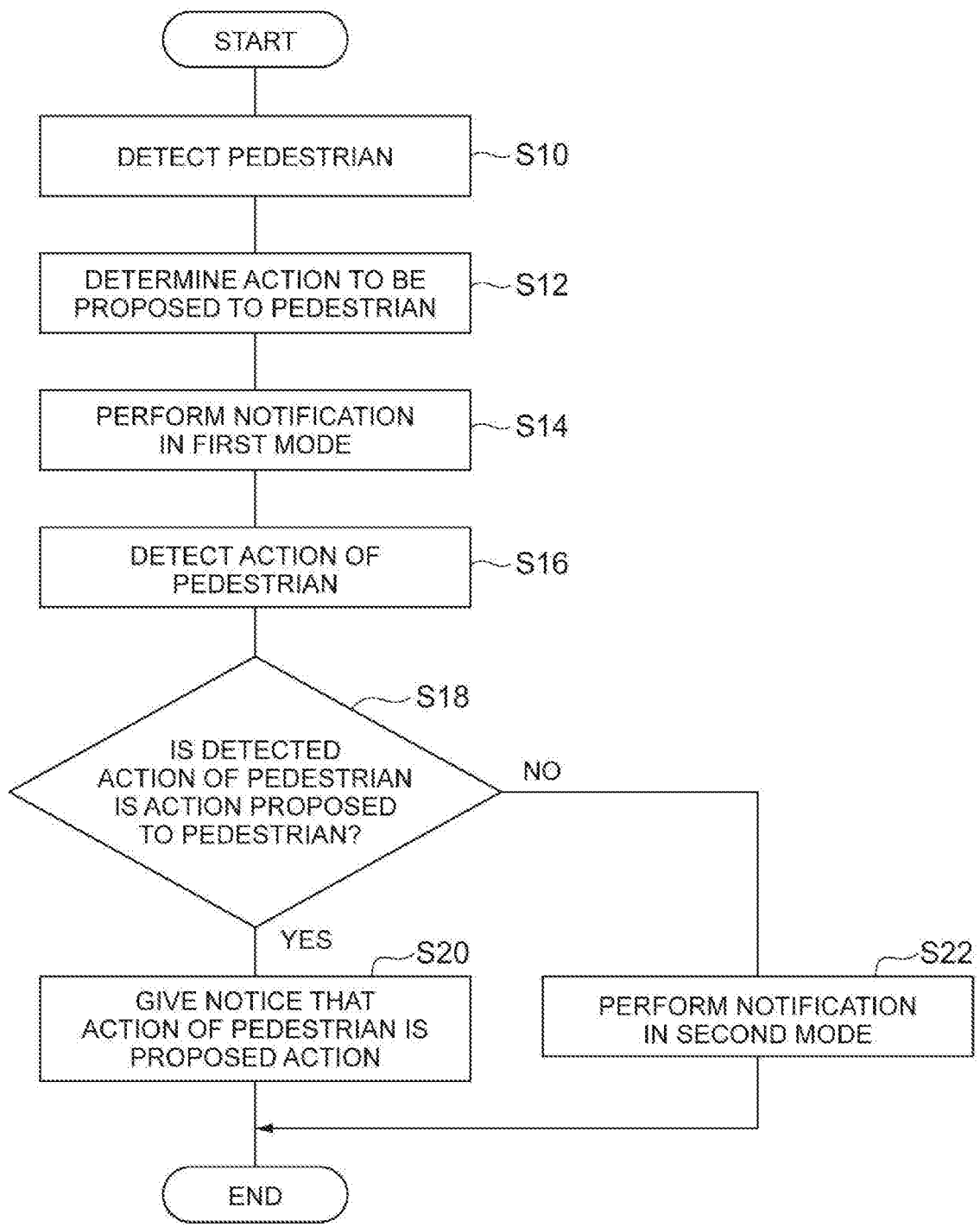
FIG. 5 is a flowchart illustrating a notification process.

Hereinafter, an information notification process of the vehicle external notification device 100 will be described with reference to the situation illustrated in FIG. 4. FIG. 5 is a flowchart illustrating a notification process. The flowchart of FIG. 5 is executed when the host vehicle V is in an automatic driving mode.

As illustrated in FIG. 5, in step S10, the vehicle external notification device 100 detects the pedestrian P in the vicinity of the host vehicle V by the external sensor 1. In FIG. 4, the pedestrian P is detected at the side strip in the vicinity of the pedestrian crossing Z provided in front of the host vehicle V. Thereafter, the vehicle external notification device 100 proceeds to step S12.

In step S12, the ECU 10 of the vehicle external notification device 100 predicts a future action of the pedestrian P by the proposal action determination unit 11, and determines an action to be proposed to the pedestrian P. In FIG. 4, the proposal action determination unit 11 predicts that the future action of the pedestrian P is an action of crossing the pedestrian crossing Z. The proposal action determination unit 11 determines the action to be proposed to the pedestrian P to be an action indicating that the pedestrian P crosses the pedestrian crossing Z before the host vehicle V passes through the pedestrian crossing Z. Thereafter, the vehicle external notification device 100 proceeds to step S14.

In step S14, the ECU 10 of the vehicle external notification device 100 causes the notification unit 4 to notify the pedestrian P of information on the action to be proposed to the pedestrian P in the first mode, by the notification control unit 12. Thereby, the vehicle external notification device 100 proposes an action indicating that the pedestrian P crosses the pedestrian crossing Z before the host vehicle V passes through the pedestrian crossing Z, to the pedestrian P. Thereafter, the vehicle external notification device 100 proceeds to step S16.

In step S16, the ECU 10 of the vehicle external notification device 100 detects an action of the pedestrian P by the action detection unit 13. The action detection unit 13 acquires a moving vector of the pedestrian P on the basis of information received from the external sensor 1. The action detection unit 13 detects the action of the pedestrian P on the basis of the amount of change in the moving vector for a predetermined time. In FIG. 4, for example, the action detection unit 13 may detect that the pedestrian P has started to cross the pedestrian crossing Z before the host vehicle V passes through the pedestrian crossing Z, may detect that the pedestrian P has not started to cross the pedestrian crossing Z, and may detect that the pedestrian has turned back in the middle of the pedestrian crossing Z after the pedestrian P starts to cross the pedestrian crossing Z. Thereafter, the vehicle external notification device 100 proceeds to step S18.

In step S18, the ECU 10 of the vehicle external notification device 100 determines whether or not the action of the pedestrian P is the action proposed to the pedestrian P by the action determination unit 14. In FIG. 4, the action determination unit 14 determines whether or not the action of the pedestrian P is an action indicating that the pedestrian P crosses the pedestrian crossing Z before the host vehicle V passes through the pedestrian crossing Z. When the vehicle external notification device 100 determines that the action of the pedestrian P is the action proposed to the pedestrian P (step S18: YES), the vehicle external notification device proceeds to step S20. On the other hand, when the vehicle external notification device 100 determines that the action of the pedestrian P is not the action proposed to the pedestrian P (step S18: NO), the vehicle external notification device proceeds to step S22.

In step S20, the ECU 10 of the vehicle external notification device 100 causes the notification unit 4 to notify the pedestrian P of information indicating that the action of the pedestrian P is the proposed action, by the notification control unit 12. Thereby, the vehicle external notification device 100 can inform the pedestrian P that the pedestrian P acts in accordance with the proposal of the host vehicle V to thereby inform the pedestrian P that the pedestrian may continue the action. The notification control unit 12 causes the notification unit 4 to notify the pedestrian P of the information indicating that the action of the pedestrian P is the proposed action, for example, for a predetermined time, and to stop giving notice. When the vehicle external notification device 100 causes the notification unit 4 to stop notifying the pedestrian P of the information indicating that the action of the pedestrian P is the proposed action by the notification control unit 12, the vehicle external notification device terminates the current process. Thereafter, the vehicle external notification device 100 repeatedly performs the process from step S10 again.

In step S22, the ECU 10 of the vehicle external notification device 100 causes the notification unit 4 to notify the pedestrian P of information on an action to be proposed to the pedestrian P in the second mode emphasized more than the first mode, by the notification control unit 12. Thereby, the vehicle external notification device 100 makes the pedestrian P easily notice that the action of the pedestrian P is not the action proposed by the host vehicle V. The notification control unit 12 causes the notification unit 4 to notify the pedestrian P of the information indicating that the action of the pedestrian P is not the proposed action, for example, for a predetermined time, and to stop giving notice. When the vehicle external notification device 100 causes the notification unit 4 to stop notifying the pedestrian P of information on an action to be proposed to the pedestrian P by the notification control unit 12, the vehicle external notification device terminates the current process. Thereafter, the vehicle external notification device 100 repeatedly performs the process from step S10 again. Meanwhile, the flowchart of FIG. 5 is also terminated, for example, when the automatic driving of the host vehicle V is terminated.

As described above, according to the vehicle external notification device 100, an action to be proposed to the detected pedestrian P is determined, and the pedestrian P is notified of information on the determined action. When it is determined that the subsequent action of the pedestrian P is the action proposed to the pedestrian P, the pedestrian P is notified of information indicating that the action of the pedestrian P is the proposed action. Thereby, the vehicle external notification device 100 can inform the pedestrian P that the pedestrian P acts in accordance with the proposal of the host vehicle V to thereby inform the pedestrian P that the pedestrian may continue the action. Accordingly, the vehicle external notification device 100 can notify the pedestrian P that the action of the pedestrian P is recognized by the host vehicle V during automatic driving. As a result, the host vehicle V can communicate with the pedestrian P by the vehicle external notification device 100, and thus it is possible to reduce a feeling of uneasiness of the pedestrian P.

In the vehicle external notification device 100, the notification control unit 12 causes the notification unit 4 to notify the pedestrian P, which is detected by the external sensor 1, of information on an action to be proposed to the pedestrian P in the first mode, and then causes the notification unit 4 to notify the pedestrian P of the information on the action to be proposed to the pedestrian P in the second mode emphasized more than the first mode, when the action determination unit 14 determines that the action of the pedestrian P is not the action proposed to the pedestrian P. Thereby, when the pedestrian P does not act in accordance with the proposal of the host vehicle V, the vehicle external notification device 100 can make the pedestrian P easily notice that the action of the pedestrian P is not the action proposed by the host vehicle V.

The above-described embodiment can be implemented in various configurations having been subjected to various modifications and improvements on the basis of the knowledge of those skilled in the art.

For example, the proposal action determination unit 11 may predict a future action of the pedestrian P on the basis of information other than information indicating that the pedestrian P is positioned at the side strip in the vicinity of the pedestrian crossing Z. For example, the proposal action determination unit 11 may predict a future action of the pedestrian P on the basis of the direction of the face, the direction of the body, an action (gesture), or the like of the pedestrian P. Alternatively, the proposal action determination unit 11 may predict the future action of the pedestrian P on the basis of, for example, the theory of probability assuming a traffic rule and the like, and specifically, the proposal action determination unit 11 may predict the future action of the pedestrian P by using a particle filter, a Kalman filter, and the like using a Monte Carlo method. In addition, the proposal action determination unit 11 may predict the future action of the pedestrian P by combining some of the above-described prediction means with each other.

In the above-described embodiment, the proposal action determination unit 11 determines an action to be proposed to the pedestrian P to be an action indicating that the pedestrian P crosses the pedestrian crossing Z before the host vehicle V passes through the pedestrian crossing Z. However, the proposal action determination unit 11 may appropriately determine an action to be proposed to the pedestrian P in accordance with, for example, a traffic situation and the like. For example, the proposal action determination unit 11 may determine an action to be proposed to the pedestrian P to be an action indicating that the pedestrian P stands by until the host vehicle V passes through the pedestrian crossing Z, and crosses the pedestrian crossing Z after the host vehicle V passes through the pedestrian crossing Z.

In addition, the notification unit 4 is not limited to a plurality of LEDs that are disposed in a row on the front surface or side surface of the host vehicle V. For example, the notification unit 4 may be a display capable of displaying character information. In this case, the notification unit 4 may display character information of "please go first" when an action to be proposed to the pedestrian P is an action indicating that the pedestrian P crosses the pedestrian crossing Z before the host vehicle V passes through the pedestrian crossing Z. The notification unit 4 may display character information of "I will pass first" when an action to be proposed to the pedestrian P is an action indicating that the pedestrian P stands by until the host vehicle V passes through the pedestrian crossing Z, and crosses the pedestrian crossing Z after the host vehicle V passes through the pedestrian crossing Z. The notification unit 4 may not make the character information flicker (that is, may not light the character information) when the character information is displayed in the first mode, and may make the character information flicker to display the character information when notification is performed in the second mode. In addition, the notification unit 4 may display character information of "Thanks for your cooperation" when the pedestrian P is notified of information indicating that the action of the pedestrian P is the proposed action. Alternatively, the notification unit 4 may display image information graphically representing contents of the character information.

In addition, the notification unit 4 is not limited to a display device that displays information so as to be recognizable from the outside of the vehicle, and may be, for example, a sound output device that outputs a sound so as to be capable of audibly recognizing information from the outside of the vehicle. Specifically, the notification unit 4 may be a speaker that outputs a sound toward the outside of the vehicle. For example, the notification unit 4 may output a sound of "please go first" when an action to be proposed to the pedestrian P is an action indicating that the pedestrian P crosses the pedestrian crossing Z before the host vehicle V passes through the pedestrian crossing Z. The notification unit 4 may output a sound of "I will pass first" when an action to be proposed to the pedestrian P is an action indicating that the pedestrian P stands by until the host vehicle V passes through the pedestrian crossing Z, and crosses the pedestrian crossing Z after the host vehicle V passes through the pedestrian crossing Z. The notification unit 4 may output the sounds at a sound volume smaller than that in the second mode when the sounds are output in the first mode, and may output the sounds at a sound volume larger than that in the first mode when notification is performed in the second mode. In addition, the notification unit 4 may output a sound of "Thanks for your cooperation"

when the pedestrian P is notified of information indicating that the action of the pedestrian P is the proposed action.

In addition, the notification unit 4 may include both a display device and a sound output device. In this case, for example, the notification unit 4 may perform the notification in the first mode only by the display device, and may perform the notification in the second mode by both the display device and the sound output device.

In addition, the notification control unit 12 may cause the notification unit 4 to notify the pedestrian P of information on an action to be proposed to the pedestrian P in the first mode, and may then cause the notification unit 4 to notify the pedestrian P of the information on an action to be proposed to the pedestrian P in the second mode, when the action determination unit 14 determines that the action of the pedestrian P is not the action proposed to the pedestrian P. For example, in this case, the notification control unit 12 may cause the notification unit 4 to notify the pedestrian P of information on the action to be proposed to the pedestrian P in the first mode.

What is claimed is:

1. A vehicle external notification device that notifies a moving object, which is provided in a vicinity of a host vehicle during automatic driving, of information, the vehicle external notification device comprising:
    a notification unit configured to give notice of the information to an outside of the vehicle during automatic driving of the vehicle;
    a moving object detection unit configured to detect the moving object located outside of the vehicle during automatic driving of the vehicle;
    a proposal action determination unit configured to determine a proposed action for the moving object detected by the moving object detection unit;
    a notification control unit configured to cause, during automatic driving of the vehicle, the notification unit to notify the moving object that is located outside of the vehicle, which is detected by the moving object detection unit, of information on the proposed action to the moving object;
    an action detection unit configured to detect an action of the moving object detected by the moving object detection unit after the notification unit has notified the moving object of the information on the proposed action; and
    an action determination unit configured to determine whether or not the action of the moving object which is detected by the action detection unit is the proposed action that was notified to the moving object by the notification unit,
    wherein, based upon a determination that the action of the moving object is the proposed action, the notification control unit causes the notification unit to notify the moving object of information indicating that the action of the moving object is the proposed action.

2. The vehicle external notification device according to claim 1,
    wherein the notification control unit causes the notification unit to notify the moving object, which is detected by the moving object detection unit, of the information on the action to be proposed to the moving object in a first mode, and then causes the notification unit to notify the moving object of the information on the action to be proposed to the moving object in a second mode emphasized more than the first mode, when the action determination unit determines that the action of the moving object is not the action proposed to the moving object.

3. The vehicle external notification device according to claim 1, further comprising a positioning unit, wherein a future action of the moving object is predicted on the basis of positional information of the vehicle on a map which is measured by the positioning unit.

4. The vehicle external notification device according to claim 1, wherein a future action of the moving object is predicted on the basis of a traveling plan of the host vehicle that was generated by an automatic driving control unit.

5. The vehicle external notification device according to claim 1, wherein the proposal action determination unit determines an action to be proposed to the moving object so that the moving object can execute the predicted action.

6. A vehicle external notification device that notifies a moving object, which is provided in a vicinity of a host vehicle outside of the host vehicle during automatic driving of the host vehicle, of information, the vehicle external notification device comprising:
    detectors outside of the vehicle configured to detect the moving object during automatic driving of the host vehicle; and
    one or more processors programmed to:
    notify the information to the moving object located at an outside of the host vehicle during automatic driving of the host vehicle;
    determine a proposed action, which is an action proposed for the moving object to execute;
    notify the moving object, which has been detected outside of the host vehicle, of the proposed action;
    detect, during automatic driving of the host vehicle, an action of the moving object after notifying the moving object of the proposed action; and
    determine, during automatic driving of the host vehicle, whether the action of the moving object is same as the proposed action, and
    when the action of the moving object is the same as the proposed action, notify the moving object that the action of the moving object is the same as the proposed action.

* * * * *